A. J. ROBINSON.
FAUCET.
APPLICATION FILED AUG. 22, 1908.
940,556.
Patented Nov. 16, 1909.
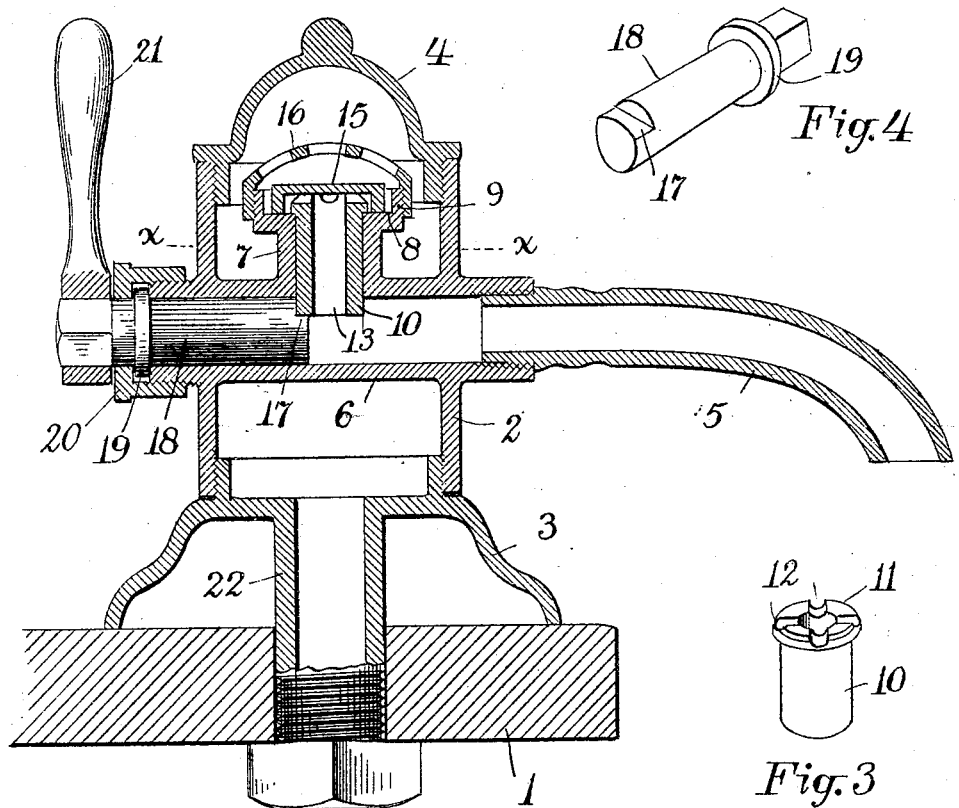
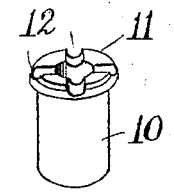
Witnesses:
M. W. Upham.
Fred G. Tilton.
Inventor,
Andrew J. Robinson,
By A. B. Upham,
Attorney.

UNITED STATES PATENT OFFICE.

ANDREW J. ROBINSON, OF BOSTON, MASSACHUSETTS.

FAUCET.

940,556.  Specification of Letters Patent.  Patented Nov. 16, 1909.

Application filed August 22, 1908. Serial No. 449,796.

*To all whom it may concern:*

Be it known that I, ANDREW J. ROBINSON, a citizen of the United States, and a resident of the city of Boston, in the county of Suffolk and Commonwealth of Massachusetts, have invented certain new and useful Improvements in Faucets, of which the following is a specification.

The object of this invention is the construction of a self-closing faucet embracing the improvements hereinafter set forth.

Referring to the drawings forming part of this specification, Figure 1 is a central vertical section of a faucet made in accordance with my invention. Fig. 2 is a horizontal section of the same on the line X—X in Fig. 1. Fig. 3 is a perspective view of one of the elements termed a "strut" employed in the faucet. Fig. 4 is a perspective view of the valve opening device.

This faucet is mainly designed for use in connection with wash-basins and the like, wherein the water is conducted up from below the marble top surrounding such basin, as represented in Fig. 1, in which figure the reference numeral 1 designates such top or shelf. The main visible portion of this faucet is the cylindrical casing 2, base 3 and top 4, all secured water-tight together, and the outlet or spigot 5. Diametrically through this cylindrical casing, and preferably integral therewith, is the tubular section 6 into the front outer end of which said spigot is tapped. Rising from the midlength of this tubular section is the tubular branch 7 terminating at its upper end in the seat 8 surrounded by the upwardly-rising flange 9. Within said tubular branch and loosely fitting it, is the strut 10 formed with enough of a head 11 to keep it from dropping to the bottom of the said branch, as shown in Figs. 1 and 3. This head is chamfered about its upper edge, and formed with several radial grooves 12 reaching the central opening 13 of the strut.

Resting water-tight upon the seat 8 when the strut is in its lowermost position, is the valve 15 shown in Fig. 1 and consisting merely of a flanged disk. A cage 16 screwing about the flange or rim 9 serves to keep said valve from becoming displaced. Another and even more important function of said cage is that which it serves in limiting the flow of water through the valve. When said cage is screwed down close to the valve 15, the latter can be raised but a slight distance, and consequently but little water can flow from the faucet. A higher adjustment of said cage permits a wider opening of the valve, and a larger flow of water. This feature is of special importance in high office buildings, where the difference of water-pressure at the various floors is very marked.

Inasmuch as increased water-pressure gives increased volume of water issuing through the same opening, a faucet at a top floor will yield but a scanty amount of water per unit of time, while the same faucet at a lower floor might yield several times as much. Hence, by turning said cage well down in the faucets of a lower floor, less close in the floors above, to a comparatively elevated position in the topmost faucets, the flow from all the faucets throughout the building can be made practically if not absolutely uniform.

Immediately below the strut 10 is the shoulder 17 of the spindle 18 rotatably held in the tubular section 6 and kept from longitudinal displacement by an annular rib 19 fitted between the end of said section and the collar 20 screwed thereon. Upon the projecting end of this spindle is fixed a handle 21 for enabling it to be turned by hand. When this handle is vertical, the shoulder 17 is horizontal and the strut in its lowermost position; but when the handle is moved toward either side, an edge of the shoulder elevates the strut and by such elevation raises the valve 15 sufficiently to admit water from within the casing to the tubular section, and thence to the spigot 5. Upon the release of the handle, the water-pressure upon the valve forces the latter downward until again closed, such force compelling the spindle to turn until its shoulder is horizontal and its handle vertical.

By rendering the juncture of the cylindrical casing 2 and the base and top, 3, 4, thoroughly water-tight, in any well-known manner, as by rubber gaskets, or preferably white-lead applied to the screw-threads, this faucet will be found to be non-leakable. The reason for this is that the opening 13 through the strut 10 is smaller in diameter than the channel through the spigot 5, and hence there is no back-pressure past the spindle to the exterior of the casing. Among other advantages secured by the casing are these: In the first-place, it is the only way by means of which the water can come up from below to the faucet, and still permit of the employment of a gravity valve; except by the use of piping which must ascend beside the faucet and thence down thereto. Such latter arrangement would be more expensive, unsightly and laborious to keep clean and polished. With my device, on the other hand, the water ascends directly from below through the intake 22, rises past the valve and thence down into the spigot. The construction is comparatively inexpensive, attractive in appearance and easily cleaned and polished. Further, the interior of the casing forms an enlarged chamber through which the water rises with a reduced current. Consequently whatever grit may happen to be brought along in the water is deposited within such chamber instead of being carried to the valve and left upon the valve-seat to interfere with the tight closure of the valve. By shutting off the water at the main, and unscrewing the cylinder 2 from the base 3, the interior of the casing and valve can be easily cleansed and scalded.

It is, of course, evident that a self-closing faucet which depends upon gravity and water-pressure for its automatic closure, is more durable and unlikely to fail in its operation than one which is closed by means of a spring liable to break or become set at any moment.

What I claim as my invention and for which I desire Letters Patent is as follows, to wit:—

1. A faucet comprising a casing, an inlet thereto for a liquid under pressure, an outlet having a valve-seat, a lift-valve on said seat, externally operated means for lifting said valve, and an adjustable cage above said valve, whereby the limit of said valve's movement can be varied to insure a specified flow of liquid therethrough.

2. A faucet comprising a cylindrical casing receiving the liquid to be delivered, a tube traversing the casing diametrically and integral therewith, an outlet at one end of the tube, a spindle rotatably held in the opposite end of the tube and formed with a segmental shoulder and external means for turning it, a mouth having a horizontal seat being formed at an intermediate point of said tube, a valve resting upon the seat and normally closing the mouth, and a strut between said valve and shoulder for the elevation of the valve by the turn of the spindle.

3. A faucet comprising a cylindrical casing receiving the liquid to be delivered, a tube traversing the casing diametrically and integral therewith, an outlet at one end of the tube, a tubular branch rising from an intermediate point of the tube and terminating in a flanged seat, a valve normally resting upon the seat, a cage fixed to the flange of said seat, and externally actuated means for raising said valve.

4. A faucet comprising a tube having an outlet at one end, a collar fixed upon the other end, a spindle rotatable within said collared end and having an annular rib located between such end and collar, means for turning the spindle, a segmental shoulder being formed at the inner end of the spindle, a tubular section rising from the tube at an intermediate point, a valve closing the tubular section, a strut engaging said shoulder and valve for opening the latter, and means for supplying liquid to said tubular branch.

5. In a faucet, the combination of a casing, a vertically rising tubular member within said casing communicating at its lower end with the faucet outlet, means for admitting liquid within the casing, a valve-seat about the opening in said tubular member and screw threads about the periphery of said member, a valve resting on said seat, a strut rising within said tubular member and externally operated means for elevating it, and an internally threaded member engaging said screw threads, and limiting the upward movement of said valve.

In testimony that I claim the foregoing invention, I have hereunto set my hand this 20th day of August, 1908.

ANDREW J. ROBINSON.

Witnesses:
A. B. UPHAM,
BURTON PAYNE GRAY.